United States Patent [19]

Ishi

[11] Patent Number: 5,784,226
[45] Date of Patent: Jul. 21, 1998

[54] MAGNETORESISTIVE HEAD WITH OPTIMIZED SOFT MAGNETIC BIAS LAYER

[75] Inventor: Tsutomu Ishi, Tokyo, Japan

[73] Assignee: NEC Corporation, Tokyo, Japan

[21] Appl. No.: 806,692

[22] Filed: Feb. 26, 1997

[30] Foreign Application Priority Data

Feb. 27, 1996 [JP] Japan ................... 8-039326

[51] Int. Cl.$^6$ ................... G11B 5/39
[52] U.S. Cl. ................... 360/113
[58] Field of Search ................... 360/113

[56] References Cited

U.S. PATENT DOCUMENTS 5,285,339   2/1994   Chen ................... 360/113

FOREIGN PATENT DOCUMENTS 6-84145   3/1994   Japan.

*Primary Examiner*—A. J. Heinz
*Attorney, Agent, or Firm*—Helfgott & Karas, P.C.

[57] ABSTRACT

In a magnetoresistive head, a magnetoresistive layer (6) detects a magnetic field signal from a magnetic recording medium on the basis of resistance changes, a soft magnetic bias layer (4) applies a transverse bias magnetic field to the magnetoresistive layer (6), a longitudinal bias layer (7) applies a longitudinal bias magnetic field to the magnetoresistive layer, a lead layer (8) supplies a sense current to the magnetoresistive layer (6). The soft magnetic bias layer (4) is made of a material having a transverse uni-axial anisotropy field, and the magnitude of the anisotropy field is below 20 [Oe].

8 Claims, 3 Drawing Sheets

MAGNETORESISTIVE HEAD WITH OPTIMIZED SOFT MAGNETIC BIAS LAYER

BACKGROUND OF THE INVENTION

The present invention relates to a magnetoresistive head for reading out data from magnetic recording media.

Fabrication of thin film magnetic heads have utilized thin film formation techniques and photolithgraphic techniques. Specifically, a fine magnetic circuit is formed on a substrate by using these techniques, followed by mechanical finishing. Such thin film magnetic heads is one essential technique indispensable for increasing the recording density of recent magnetic recorders such as magnetic disc drivers and magnetic tape recorders. Especially, magnetoresistive (MR) heads for reading only, utilizing the magnetoresistive effect, are key devices to promote the size reduction and capacity increase of hard magnetic disc devices.

In order to make electromagnetic conversion characteristics of MR heads stable and improve the yield of manufacture, it is important to clarify the relationship between magnetostriction and stress of a magnetoresistive layer (hereinafter referred to as "MR layer") for detecting a magnetic field signal from a magnetic recording medium and a soft magnetic bias layer (hereinafter referred to as "SAL" (Soft Adjacent Layer) as transverse bias means for holding the MR layer in an optimal biased state. The relationship between the magnetostriction and stress is important in that a commonly called stress-induced anisotropy field is induced by magnetoelastic effect and has considerable influence on the magnetized state of the MR and SAL.

The stressed configuration of the MR and SAL is influenced and varied complicatedly by the differences in the thermal expansion coefficient among layers, geometrical shapes of patterned elements, and mechanical polishing processes for forming air bearing surfaces (hereinafter referred to as "ABS"). As is well known in the art, for instance as disclosed in Japanese Laid-Open Patent Publication No. Heisei 6-84145, the ABS side of an element becomes a free surface after the formation of ABS, generating an anisotropic tensile stress in the MR and SAL in a direction perpendicular to the ABS. The publication teaches forming an MR layer from a material with a small magnetostriction coefficient, specifically $1 \times 10^{-6}$ and above. The publication also teaches forming an SAL from a material with a large positive magnetostriction coefficient, specifically $5 \times 10^{-6}$ and above.

As disclosed in the above publication, when the SAL with a highly positive magnetostriction coefficient is used, a high stress-induced anisotropy field is induced in the vertical direction of the element along with a tensile stress in the direction normal to the ABS. The magnetization of the SAL is thus readily saturated. This permits a magnetization state suitable as the transverse bias means to be realized to enable application of a suitable transverse bias field to the MR layer.

When a high induced anisotropy field is generated in the vertical direction of the element, however, it is possible that the SAL magnetizing mode is changed from a magnetization rotation mode to a magnetic domain wall movement mode with respect to an external magnetic field in the height direction of the element. In view of the magnetic field signal from the magnetic recording medium, as applied in the vertical direction of the element, the mode change noted above may promote the instability of the magnetized state of the SAL, giving rise to variations of the transverse bias state and adversely affecting the electromagnetic conversion characteristics of the MR head. The prior art technique has no attention to the stability of the SAL magnetization state and the electromagnetic conversion characteristic of MR head.

SUMMARY OF THE INVENTION

An object of the present invention is to provide an MR head having stable electromagnetic conversion characteristics with a high yield of manufacture by controlling the anisotropy field of the SAL to an optimum value.

According to an aspect of the present invention, there is provided a magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the soft magnetic bias layer being made of a material having a transverse uni-axial anisotropy field, the magnitude of the anisotropy field being below 20 [Oe].

According to another aspect of the present invention, there is provided a magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the soft magnetic bias layer being made of a longitudinal uni-axial anisotropy field, the magnitude of the anisotropy field being below 40 [Oe].

According to other aspect of the present invention, there is provided a magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the soft magnetic bias layer being made of a material with a saturation magnetostriction constant in a range of $+2 \times 10^{-6}$ to $-4 \times 10^{-6}$.

Other objects and features will be clarified from the following description with reference to attached drawings.

PREFERRED EMBODIMENTS OF THE INVENTION

Figure 2:
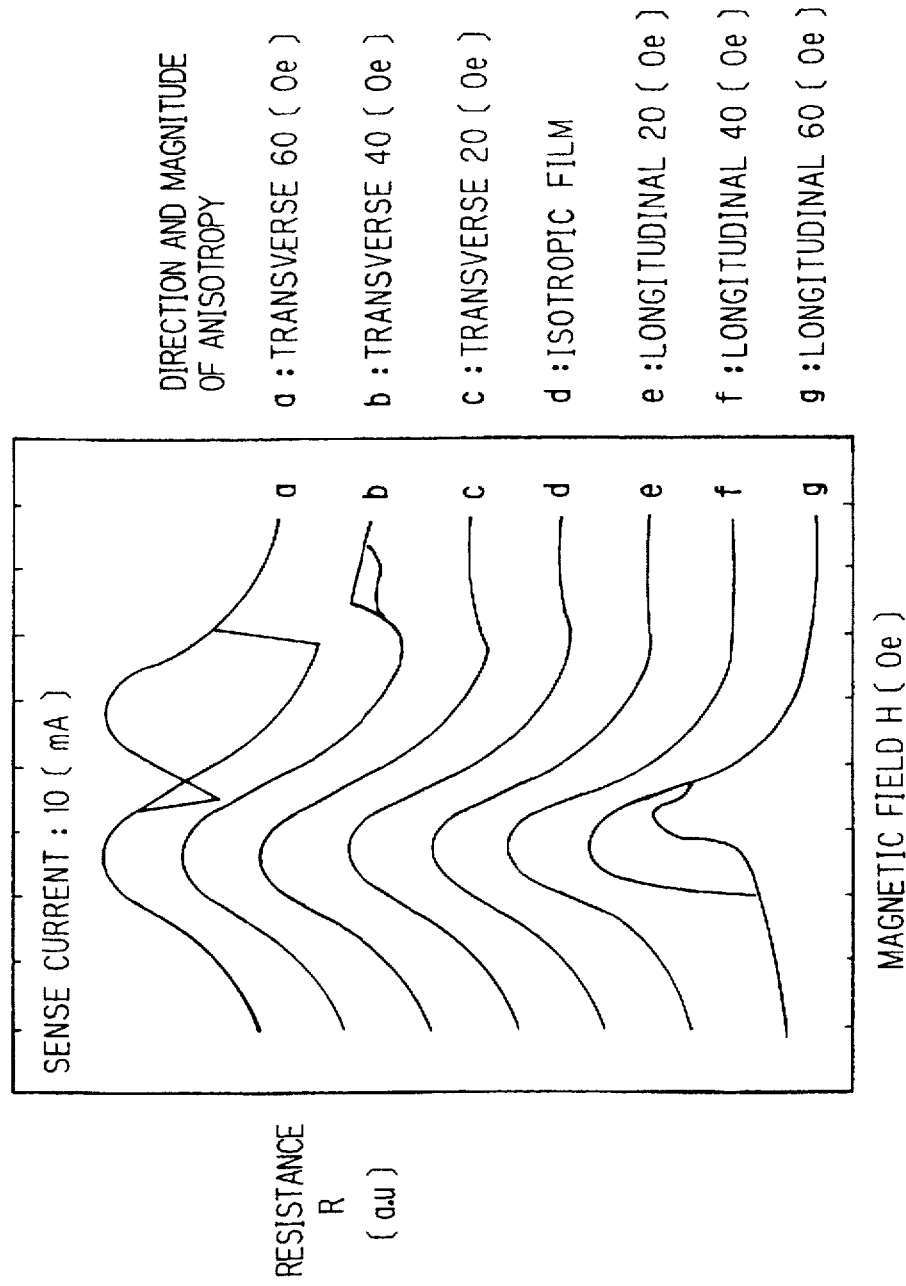
FIG. 2 shows resistance-magnetic field curves and the direction and magnitude of the anisotropy field of the SAL of MR heads according to the present invention.

FIG. 2 shows resistance-magnetic field curves (hereinafter referred to as "R-H curves") and the direction and magnitude of the anisotropy field of the SAL of MR heads according to the present invention, as calculated simulation results. The sense current was set to 10 [mA].

With SAL having transverse anisotropy field of magnitudes up to 20 [Oe], the R-H curves have no hysteresis. With greater transverse anisotropy field magnitudes, the R-H curves have hysteresis on their right side, i.e., their region in which a magnetic field is applied to the direction opposite to the direction of saturation magnetization of the SAL. It is thus presumable that where the SAL has a large transverse anisotropy field, the SAL magnetizing mode involves magnetic domain wall movement, and in this case application of an external magnetic field to the SAL in the direction opposite to the direction of the saturation magnetization causes a sudden change in the magnetized state with respect to a certain magnetic field value, thus causing a hysteresis in the R-H curve.

With SAL having longitudinal anisotropy field of magnitudes up to 40 [Oe], the R-H curves have no hysteresis. With a greater longitudinal anisotropy field, great hysteresis is found in the neighborhood of a peak of the R-H curve. It is presumable that where the SAL has great longitudinal anisotropy field, uniform saturation of magnetization of the SAL in the transverse direction is prevented, thus causing a hysteresis in the R-H curve.

An MR head having stable characteristics is thus obtainable by controlling the direction and magnitude of the anisotropy field of the SAL, specifically setting the anisotropy field magnitude to be below 20 [Oe] in the case of the transverse anisotropy field and below 40 [Oe] in the case of the longitudinal anisotropy field.

Figure 1:
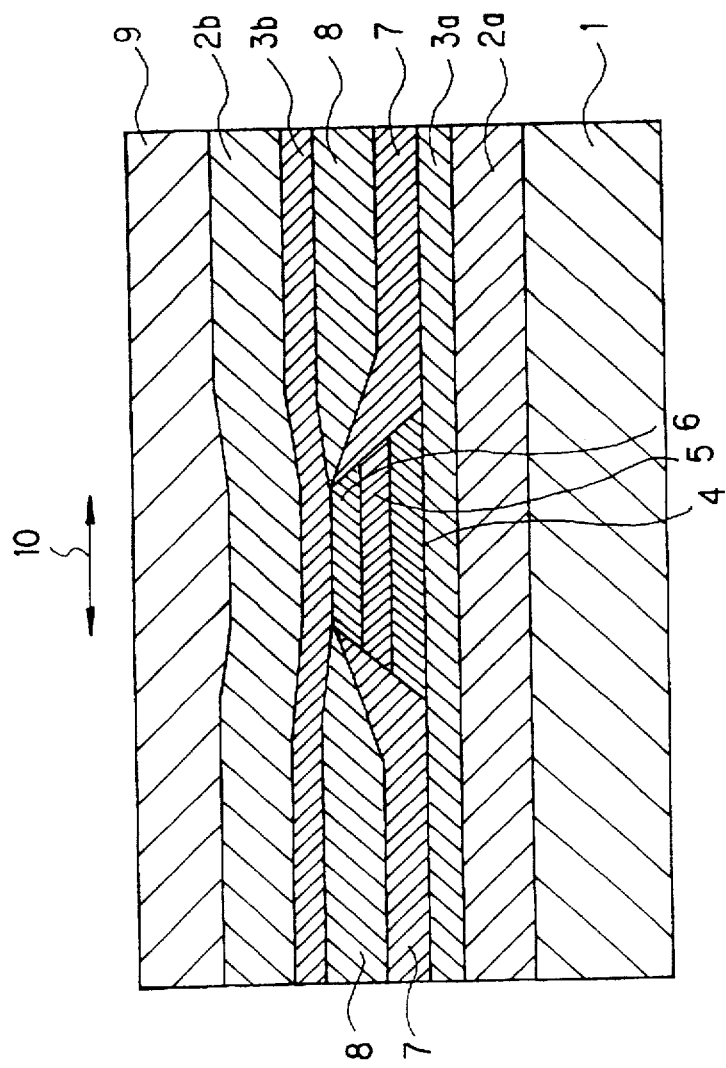
FIG. 1 is a sectional view showing an MR head according to a first and a second embodiments of the present invention, taken in a plane parallel to the surface of a magnetic recording medium when the head is assembled in a magnetic recorder.

FIG. 1 is a sectional view showing an MR head as a first and a second embodiments of the present invention, taken in a plane parallel to the surface of a magnetic recording medium when the head is assembled in a magnetic recorder. In the following description, the direction perpendicular to and the leftward/rightward directions of the plane of the figure, are referred to as a transverse and a longitudinal directions, respectively.

The first embodiment of the MR head has an MR layer 6, a magnetic separation layer 5, and an SAL 4 for applying a transverse bias field to the MR layer 6, these layers being formed over a substrate 1 in a track region (or field sensitive region) 10 thereof when it is assembled in the magnetic recorder. A longitudinal bias application layer 7 for applying a longitudinal bias field to the MR layer 6, is provided on the opposite sides thereof. A lead layer 8 for applying a sense current to the MR layer 6, is formed on the longitudinal bias application layer 7. The structure as described is sandwiched between a pair of magnetic shield layers 2a and 2b via non-magnetic and electrically insulated gap layers 3a and 3b. On top of this structure, an overcoat layer 9 is formed.

An example of actual fabrication of the MR head will be described.

An $SAL_2O_3$—TiC was employed as the substrate 1. A Ni—Fe plating film 2 [µm] in thickness was formed as the magnetic shield layer 2a. Then, a layer of $Al_2O_3$ having a thickness of 0.1 [µm] is sputtered to and formed as the gap layer 3a. Then, a Co—Zr—Mo film, a Ta film 15 [nm] in thickness, and a Ni—Fe film 20 [nm] in thickness, are sputtered and formed as the SAL, magnetic separation and MR layers 4 to 6, respectively. The laminate as obtained above was then patterned by ion mill etching to leave it only in the track region (for field sensitive region). As specific examples, saturation magnetostriction constant of the Co—Zr—Mo film as the SAL 4 was set to 6, 4, 2, 0, −2, −4 and −6 ($\times 10^{-6}$) by appropriately selecting the Co content in the SAL film 4. By varying the magnetostriction constant, the saturation magnetization of the Co—Zr—Mo film was varied. The thickness was adjusted such that the product of the saturation magnetization and the thickness of the SAL 4 was 70 to 75% of the product of the saturation magnetization and the thickness of the MR layer 6. The setting of the saturation magnetostriction constant the SAL 4 to the above values, permits controlling, by utilizing a magnetoelastic effect, the direction and magnitude of the anisotropy field of the SAL 4 after the head assembling process to 60, 40 and 20 [Oe] transverse and 40, 20 and 20 [Oe] longitudinal. A Co—Cr—Pt film 25 [nm] in thickness is then sputtered and formed as the longitudinal bias layer 7 on the opposite sides of the trilayer laminate. An Au film 0.15 [µm] was then sputtering formed to a predetermined shape as the lead layer 8. An $Al_2O_3$ 0.15 [µm] is then sputtered and formed as the gap layer 3b again. Then a Ni—Fe plating layer 2 [µm] in thickness is formed as the magnetic shield layer 2b. Finally, an $Al_2O_3$ film 50 [µm] in thickness is sputtered and formed as the overcoat film 9. The structure thus obtained was then fed through a mechanical polishing process and a head assembling process, thus completing the fabrication of the MR head.

The electromagnetic conversion characteristics of the fabricated MR heads were examined. With MR heads in which the saturation magnetostriction constant of the SAL was above $+4\times 10^{-6}$ and $-6\times 10^{-6}$, distortions were observed in reproduced waveforms. With MR heads with SAL magnetostriction constants ranging from $+2\times 10^{-6}$ to $-4\times 10^{-6}$ satisfactory reproduced waveforms free from distortion could be obtained. MR heads with stable magnetostriction properties thus could be obtained by setting the magnitude of the anisotropy field of the SAL to be below 20 [Oe] in the case of the transverse anisotropy field and below 40 [Oe] in the case of the longitudinal anisotropy field.

A second embodiment of the MR head according to the present invention will now be described with reference to FIG. 1.

An $Al_2O_3$—TiC substrate was used as the substrate 1, and as the magnetic shield film 2a a Ni—Fe plating film 2 [µm] in thickness was formed and patterned by ion mill etching into a predetermined shape. Then an $Al_2O_3$ film 0.1 [µm] in thickness was sputtering formed as the film 3a, and a Ni—Fe—Nb film, a Ta film 15 [nm] in thickness, and a Ni—Fe film 20 [nm] in thickness were sputtering formed as the SAL 4, magnetic separation layer 5 and MR layer 6, respectively. The laminate thus obtained was then patterned by ion mill etching such that it is left only in the track region (or field sensitive region) 10. As specific examples, the saturation magnetostriction constant was set to 6, 4, 2, 0, −2, −4 and −6 ($\times 10^{-6}$) by appropriately selecting the Ni content of the Ni—Fe—Nb film as the SAL 4. The magnitude of the saturation magnetization of the Ni—Fe—Nb film was also varied. The thickness was adjusted such that the product of the saturation magnetization and thickness of the SAL 4 is 70 to 75% of the product of the magnetic saturation and thickness of the MR layer 6. The setting of the saturation magnetostriction constant of the SAL 4 to these values permits controlling, by utilizing the magnetoelastic effect as in the first embodiment, the direction and magnitude of the anisotropy field of the SAL 4 after the head assembling process to 60, 40 and 20 [Oe] in the transverse direction and 40 and 60 [Oe] in the longitudinal direction. Afterwards, the same process utilized in the first embodiment was carried out to complete the fabrication of the MR head.

The electromagnetic conversion characteristics of the fabricated MR heads were examined. Like the first embodiment, with MR heads with SAL saturation magnetostriction constants of above +4 and $-6(\times 10^{-6})$ distortions were observed in reproduced waveforms, while with MR heads with SAL saturation magnetostriction constants of +2 to $-4(\times 10^{-6})$ satisfactory reproduced waveforms free from distortion could be obtained. MR heads with stable electromagnetic conversion characteristics could be obtained by setting the magnetic anisotropy of the SAL to be below 20 [Oe] in the transverse anisotropy field and below 40 [Oe] in the case of the longitudinal anisotropy field.

Figure 3:
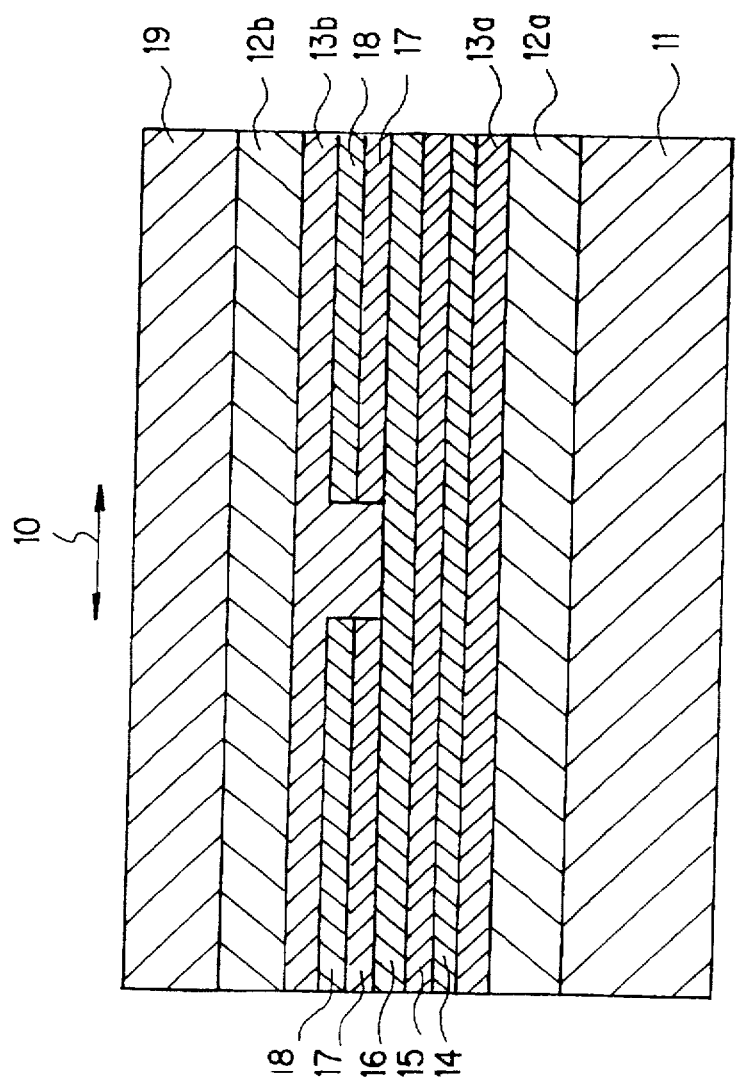
FIG. 3 shows a third embodiment of the MR head according to the present invention, taken in a plane parallel to the surface of a magnetic recording medium when the head is assembled in a magnetic recorder.

FIG. 3 shows a third embodiment of the MR head according to the present invention, taken in a plane parallel to the surface of a magnetic recording medium when the head is assembled in a magnetic recorder. In the following description, the directions perpendicular to and the leftward/rightward directions of the plane of the figure, are referred to as a transverse and as a longitudinal directions, respectively.

The third embodiment of the MR head comprises a MR layer 16 formed on a substrate 11, a magnetic separation layer 15 formed thereon, and a SAL 14 for applying a transverse bias field to the MR layer 16. On this laminate is formed a longitudinal bias layer 17 for applying a transverse bias field to the MR layer 16, and a lead layer 18 for supplying a sense current to the MR layer 16. In the lead layer 18, a space is formed, which has a width corresponding to a track region (or a field sensitive region) 10 when the head is assembled in a magnetic recorder. The structure described above is provided between paired magnetic shield layers 12a and 12b via non-magnetic and electrically insulating gap layers 13a and 13b. An overcoat layer 19 is formed on top of the laminate as described.

An example of actual fabrication of the MR head embodying the present invention will now be described.

An $Al_2O_3$—TiC substrate was used as the substrate 11, and as the magnetic shield film 12a a Ni—Fe plating film 2 [μm] in thickness was formed and patterned by ion mill etching into a predetermined shape. Then an $Al_2O_3$ film 0.1 [μm] in thickness is sputtered and as the film 13a, and a Ni—Fe—Nb film, a Ta film 15 [nm] in thickness, and a Ni—Fe film 20 [nm] in thickness are sputtered and formed as the SAL 14, magnetic separation layer 15 and MR layer 16, respectively. As specific examples, the saturation magnetostriction constant was set to 6, 4, 2, 0, -2, -4 and $-6(\times 10^{-6})$ by appropriately selecting the Ni content of the Ni—Fe—Nb film as the SAL 14. The magnitude of the saturation magnetization of the Ni—Fe—Nb film was also varied. The thickness was adjusted such that the product of the saturation magnetization and thickness of the SAL 14 is 70 to 75% of the product of the magnetic saturation and thickness of the MR layer 16. The setting of the saturation magnetostriction constant of the SAL 14 to these values permits controlling, by utilizing the magnetoelastic effect as in the first embodiment, the direction and magnitude of the anisotropy field of the SAL 14 after the head assembling process to 60, 40 and 20 [Oe] in the transverse direction and 40 and 60 [Oe] in the longitudinal direction. Subsequently, a Ni—Mn film 25 [nm] in thickness is then sputtered and formed as the longitudinal bias layer 17 on the laminate. An Au film 0.15 [μm] is also sputtered and formed to a predetermined shape as the lead layer 18. Through the patterning of the layers, the track region 10 was formed. An $Al_2O_3$ 0.15 [μm] is then sputtered and formed as the gap layer 13b again. Then a Ni—Fe plating layer 2 [μm] in thickness is formed as the magnetic shield layer 12b. Finally, an $Al_2O_3$ film 50 [μm] in thickness is sputtered and formed as the overcoat film 19. The structure thus obtained is then fed through a mechanical polishing process and a head assembling process, thus completing the fabrication of the MR head.

The electromagnetic conversion characteristics of the fabricated MR heads were examined. Like the first and second embodiments, with MR heads with SAL saturation magnetostriction constants of above $+4\times 10^{-6}$ distortions were observed in reproduced waveforms, while with MR heads with SAL saturation magnetostriction constants of above +2 and -4 ($\times 10^{-6}$) satisfactory reproduced waveforms free from distortion could be obtained. MR heads with stable electromagnetic properties could be obtained by setting the magnetic anisotropy of the SAL to be below 20 [Oe] in the transverse anisotropy field and below 40 [Oe] in the case of the longitudinal anisotropy field.

The above three embodiments were concerned with the cases where the anisotropy field of the SAL is derived from the magnetoelastic effect which is in turn derived from the relation between magnetostriction and stress, but similar effects are obtainable in the case where the magnetoelastic effect is ignorable in the neighborhood of zero SAL magnetostriction insofar as the anisotropic magnetic field of the material forming the SAL is in the above range.

In the above three embodiments the magnetic separation layer 5 or 15 was made of Ta, but the same effects are obtainable with Ti, Zr, W, Nb either alone or in binary or above alloys. Also, the lead layer 8 or 18 is made of Ta, W, Cu or Mo as well as Au.

The longitudinal bias layer 7 in the first and second embodiments may be made of Co—Pt, Co—Cr, Co—Cr—Ni or Co—Cr—Ta as well as Co—Cr—Pt. The longitudinal bias layer 17 in the third embodiment, may be made of Ni—Mn—Cr, Fe—Mn, Fe—Mn—Cr, Ir—Mn, Pd—Mn, Pt—Mn, Rh—Mn, Ni—O, Co—O, Ni—Co—O or a laminate film of Ni—O/Co—O as well as Ni—Mn.

The present invention is applicable as well to a commonly termed MR-ID composite head, which comprises an inductive (ID) head as a write head in addition to the above MR head. The same functions and effects are of course obtainable in this case.

With the MR head according to the present invention stable electromagnetic conversion characteristics are obtainable by setting the magnitude of the anisotropy field of the SAL to be below 20 [Oe] in the case of the transverse anisotropy field and below 40 [Oe] in the case of the longitudinal anisotropy field.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the soft magnetic bias layer being made of a material having a transverse uni-axial anisotropy field, the magnitude of the anisotropy field being below 10 [Oe].

2. A magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the soft magnetic bias layer being made of a longitudinal uni-axial anisotropy field, the magnitude of the anisotropy field being below 40 [Oe].

3. The magnetoresistive head according to one of claim 1, wherein the magnetoresistive layer and the soft magnetic bias layer are substantially equal in width to a track region or field sensitive region when the magnetoresistive head is assembled in a magnetic recorder.

4. The magnetoresistive head according to one of claim 2, wherein the magnetoresistive layer and the soft magnetic bias layer are substantially equal in width to a track region or field sensitive region when the magnetoresistive head is assembled in a magnetic recorder.

5. A magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the soft magnetic bias layer being made of a material with a saturation magnetostriction constant in a range of $+2 \times 10^{-6}$ to $-4 \times 10^{-6}$.

6. The magnetoresistive head according to claim 5, wherein the magnetoresistive layer and the soft magnetic bias layer are substantially equal in width to a track region or field sensitive region when the magnetoresistive head is assembled in a magnetic recorder.

7. The magnetoresistive head according to claim 5, wherein the soft magnetic bias layer is made of a non-crystalline material mainly composed of Co.

8. The magnetoresistive head according to claim 5, wherein the soft magnetic bias layer is made of a material including Ni—Fe—M, M being at least one element selected from the group consisting of Rh, Pd, Nb, Zr, Ta, Ti, Hf, Al, Pt, AU, Cr, Ir, Mo, W and Si.

* * * * *